UNITED STATES PATENT OFFICE.

D. J. MANDELL, OF SPRINGFIELD, MASSACHUSETTS.

IMPROVEMENT IN THE MANUFACTURE OF INKSTANDS.

Specification forming part of Letters Patent No. 2,460, dated February 21, 1842.

*To all whom it may concern:*

Be it known that I, D. J. MANDELL, of Springfield, in the county of Hampden and State of Massachusetts, have invented a new and Improved Inkstand; and I do hereby declare that the following is a full and exact description.

The nature of my invention consists in providing an inkstand in which water becomes expeditiously changed into a pure, beautiful, bright, and permanent ink, black, blue, or red, as the case may be, and flowing most readily from any pen, whether of steel or quill, while the outside is so constructed as to prevent the moisture that is within from oozing through, rendering the inkstand firm and cleanly without, while the interior moistens and wears gradually away beneath the action of the water.

To enable others skilled in the art to make and use my invention, I will proceed to describe its construction and operation.

I construct my inkstand in any of the known forms and apply thereto tops, lids, moldings, carvings, decorations, and other appendages of inkstands; but in order to obviate the difficulty of keeping ink in a form in which it may freeze and thus spoil, dry and thus waste, or spill and thus be lost and soil whatever it comes in contact with, and from other causes, I construct my inkstands as follows:

First, I prepare a dough of which to form the body of inkstands which I intend to make, whether for black, blue, or red ink.

The dough for black I thus prepare: I use Prussian blue or any other blue, first pulverizing it, if necessary. If I use Prussian blue, and it be of a character to acquire blackness from extract of gall-nuts or gallic acid, I mix it with a decoction of gall-nuts (or something possessing the quality of gall-nuts) and gum-arabic. The proportion of extract of gall-nuts, or of something possessing their quality in the decoction, must be such as will secure the necessary degree of blackness to the Prussian blue, and the proportion of the gum-arabic must be such as to enable the mass with which it is mingled to give the consistency or substance as well as the color of ink to water. Mixing the Prussian blue, as above described, into a dough with the before-mentioned decoction, I sometimes prefer to give it more body or a closer texture by adding lamp-black or any other substance as well suited for the office, and in such quantity as is necessary for the purpose, adding to the dough, in whatever case, enough of bullock's gall to impart a bitter taste; or, otherwise, where I happen to be using Prussian blue, which, on account of some peculiarity in its manufacture or from some other cause, the gallic acid will not affect, or where I am using some other blue, I give it blackness by mingling it with lamp-black or any other substance capable of answering the purpose, mixing the whole, if not with the decoction of gall-nuts and gum-arabic, with gum-arabic dissolved in water in sufficient proportion, as above described, adding, as in the former case, enough of the bullock's gall to give the dough a bitter taste.

The dough for the blue I thus prepare: I take Antwerp blue, or any other blue that is sufficiently good and elegant, and having pulverized it, if necessary, I mix it with gum-arabic dissolved in water in the same proportion as in the former case, sometimes varying the shade of the blue with suitable proportions of whiting, or other material which would answer the same end, adding, as in the instance above mentioned, enough of bullock's gall to give the mass a bitter taste.

The dough for the red ink I thus prepare: I take lake, vermillion, red lead, or some other good and substantial red, either singly or in such proportions together as will best secure the most desirable shade, shades, or color, and, having pulverized them, mix them with gum-arabic dissolved in water in essentially the same proportion as in the above-mentioned instances, adding, as in those instances provided, bullock's gall enough to give the whole a bitter taste.

Second. Having in the manner thus described formed a dough for the body of the inkstands, I next press it into cases made of some metal, wood, glass, stone, or other substance, forming in the top a hole or holes, finishing all off in the manner most ornamental or expedient, seeing always that the hole or holes are provided with a rim, either of metal or some other material, to a suitable depth and extent, and that the top be covered with metal, varnish, or anything else available as a suitable covering or, otherwise, I mold the dough into a suitable form and cover the sides and bottom with any composition cleanly, ornamental, and which will harden sufficiently to make a suitable outside, firm and water-proof, preparing or finishing the hole or holes and top as above provided.

Inkstands thus made will be as hard and solid as any, will change water which is put into them into a free, beautiful, and permanent ink, and will, moreover, be neat to handle at all times as well as elegant in appearance.

What I claim as my invention, and desire to secure by Letters Patent, is—

The construction or manufacture of inkstands of the material and in the manner above described, which will change water expeditiously into an ink which will be not only of good color, substance, and permanency, but which will most freely flow upon almost any paper from almost any pen, whether steel or quill, while the inkstands themselves remain outwardly as firm and as clean to the touch to the last as any.

D. J. MANDELL.

Witnesses:
A. S. MANDELL,
JAMES W. CROOKS.